US012812493B2

(12) United States Patent
Fujishiro et al.

(10) Patent No.: US 12,812,493 B2
(45) Date of Patent: Nov. 24, 2026

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 332 days.

(21) Appl. No.: 18/303,349

(22) Filed: Apr. 19, 2023

(65) Prior Publication Data

US 2023/0328607 A1 Oct. 12, 2023

Related U.S. Application Data

(63) Continuation of application No. PCT/JP2021/038320, filed on Oct. 15, 2021.

(60) Provisional application No. 63/093,381, filed on Oct. 19, 2020.

(51) Int. Cl.
*H04W 36/24* (2009.01)

(52) U.S. Cl.
CPC .................................. *H04W 36/24* (2013.01)

(58) Field of Classification Search
CPC ... H04W 36/24; H04W 36/08; H04W 36/362; H04W 36/0005; H04W 88/00
See application file for complete search history.

(56) References Cited

U.S. PATENT DOCUMENTS

2021/0013959 A1* 1/2021 Yuan .................. H04B 7/15571
2021/0084558 A1* 3/2021 Speicher ............... H04W 36/22
2021/0235291 A1* 7/2021 Byun ................ H04W 28/0236
2022/0007212 A1* 1/2022 Hwang ................. H04W 76/19
2022/0022116 A1 1/2022 Hasegawa
2022/0053365 A1* 2/2022 Wu ................... H04W 28/0862
2022/0141749 A1* 5/2022 Luo ..................... H04W 36/305 370/331
2022/0166703 A1* 5/2022 Xu .......................... H04L 61/50
2023/0076206 A1* 3/2023 Liu ................... H04W 36/0055
2023/0292191 A1* 9/2023 Xu ........................ H04W 36/08

FOREIGN PATENT DOCUMENTS

WO 2020/202447 A1 10/2020

OTHER PUBLICATIONS

"3rd Generation Partnership Project; Technical Specification Group Radio Access Network; NR; NR and NG-RAN Overall Description; Stage 2"; Release 16; 3GPP TS 38.300 V16.2.0 (Jul. 2020); Jul. 2020; pp. 1-6.

(Continued)

*Primary Examiner* — Kibrom T Hailu
(74) *Attorney, Agent, or Firm* — Studebaker Brackett PLLC

(57) ABSTRACT

A communication control method according to a first aspect is a communication control method used in a cellular communication system. The communication control method includes performing, by a first relay node including a lower apparatus under the first relay node, handover from a first donor base station to a second donor base station together with the lower apparatus, and, upon completing the handover to the second donor base station, transmitting, by the first relay node and to the lower apparatus, a notification indicating completion of the handover.

10 Claims, 20 Drawing Sheets

(56) References Cited

OTHER PUBLICATIONS

Ericsson (moderator); "Summary of Offline Discussion on Inter-donor Migration"; 3GPP TSG-RAN WG3 Meeting #109-e; R3-205466; Online; Aug. 17-27, 2020; pp. 1-18.
Huawei; "Inter-donor-CU handover procedure analysis"; 3GPP TSG-AN WG3 meeting #109-e; R3-205292; Online; Aug. 17-28, 2020; pp. 1-6.

* cited by examiner

- Type 1 – "Plain" notification: Indication that BH link RLF is detected by the child IAB-node.
- Type 2 – "Trying to recover": Indication that BH link RLF is detected, and the child IAB-node is attempting to recover from it.
- Type 3 – "BH link recovered": Indication that the BH link successfully recovers from RLF.
- Type 4 – "Recovery failure": Indication that the BH link RLF recovery failure occurs.
- Type 4x – "Indicating child nodes to perform RLF procedure": it is implementation when the parent sending this indication, and the child node should perform RLF related procedure when receiving this indication.

FIG. 15

The following technical comments were made on options 1 to 4:

- Option 1: Pre-configuration of potential recovery nodes, e.g., using CHO.

It was pointed out, however, that cell selection was not limited to CHO candidates, and therefore, CHO would not completely solve the problem. Nevertheless, there was support for this option since it is off-the-shelf and at least alleviates the problem.

- Option 2: Additional DL indications for declaration and revocation of BH RLF.

Some companies had doubts that this option would solve the problem. One company pointed out that upon reception of the RLF indication, the child would have to remove IAB-support indicator in SIB so that the DU is not selected as parent.

- Option 3: Configuration of IAB-node with downstream topology.

There was little support for this option. Some companies pointed out that it had some similarity to option 1.

- Option 4: Nothing needed since RRC Reestablishment will fail if there is no BH connectivity.

There was support for this option especially since it does not require any further work.

Other options proposed

- Option 5: OAM-based solution

The rapporteur stresses that this is <u>not a viable</u> option when the CU manages the topology. In this case, the OAM has no clue about the IAB-node's sub-topology. Therefore, this option will not be considered.

Several companies stressed the urgency for timely completion of the WI, and to move further topology adaptation issues to Rel-17.

Rapporteur's view:

Many companies were in favor of options 1 and 4. These options do not require any specification effort. There was not enough support for any other option. The topic can be discussed again in Rel-17.

<u>No further action is taken on this topic in Rel-16.</u>

FIG. 17

| | Modification of PDCP protocol/procedures | Rerouting of PDCP PDUs buffered on intermediate IAB-nodes | Introducing UL status delivery |
|---|---|---|---|
| **Applicable to Rel-15 UEs** | **No** | **Yes** | **Yes** |
| **Signaling overhead** | **Yes**<br>New signaling for triggering data retransmission | **Yes**<br>New signaling for either deciding whether to discard the buffered data or configuring the forwarding path for the buffered data on the old route. | **Yes**<br>New signaling for confirming data reception and/or triggering data retransmission. |
| **Support of lossless delivery of UL data** | **Yes** | **No** | **Yes** |

FIG. 18

| Solution | Descriptions |
|---|---|
| C-1 | Access IAB node delays the sending of RLC ACKs to UE until a confirmation of reception at IAB donor [3, 4, 7].<br><br>When PDCP data recovery / PDCP re-establishment is triggered by RRC, UE retransmits all the PDCP SDUs for which the successful delivery has not been confirmed by lower layers as in the current PDCP specification.<br><br>C-1 would need UL status report from IAB donor to access IAB node. This could be UE bearer specific due to its end to end nature. |
| C-2 | Access IAB node delays the sending of RLC ACKs to UE until a confirmation of reception at its parent node, and the parent node should also delay the sending of RLC ACKs to its child node until a confirmation of reception at its parent node, and so on [4].<br><br>When PDCP data recovery / PDCP re-establishment is triggered by RRC, UE retransmits all the PDCP SDUs for which the successful delivery has not been confirmed by lower layers as in the current PDCP specification.<br><br>C-2 would need some enhancements towards RLC ACK/NACK operation between IAB nodes, e.g. with hop by hop RLC ARQ. BH RLC channels multiplex data from many UEs, potentially being served by different downstream IAB nodes. This may lead to stalling RLC ACKs for some UEs based on data being not confirmed for other UEs. |

FIG. 19

COMMUNICATION CONTROL METHOD

RELATED APPLICATIONS

The present application is a continuation based on PCT Application No. PCT/JP2021/038320, filed on Oct. 15, 2021, which claims the benefit of U.S. Provisional Application No. 63/093,381 filed on Oct. 19, 2020. The content of which is incorporated by reference herein in their entirety.

TECHNICAL FIELD

The present invention relates to a communication control method used in a cellular communication system.

BACKGROUND OF INVENTION

In the Third Generation Partnership Project (3GPP), which is a standardization project of a cellular communication system, introduction of a new relay node referred to as an Integrated Access and Backhaul (IAB) node is under study (for example, see "3GPP TS 38.300 V16.2.0 (2020-07)"). One or more relay nodes are involved in communication between a base station and a user equipment, and perform relay for the communication.

SUMMARY

A communication control method according to a first aspect is a communication control method used in a cellular communication system. The communication control method includes performing, by a first relay node including a second relay node under the first relay node, handover from a first donor base station to a second donor base station together with the second relay node, and, upon completing the handover to the second donor base station, transmitting, by the first relay node and to the second relay node, a notification indicating completion of the handover.

A communication control method according to a second aspect is a communication control method used in a cellular communication system. The communication control method includes performing, by a first relay node including a second relay node under the first relay node, handover from a first donor base station to a second donor base station together with the second relay node, and, upon completing the handover to the second donor base station, transmitting, by the first relay node and to the second donor base station, a first access message directed to the second donor base station received from the second relay node.

BRIEF DESCRIPTION OF THE DRAWINGS

FIG. 15 is a diagram illustrating types of BH RLF notifications.

FIG. 17 is a diagram illustrating identified solutions for avoiding reestablishment to a descendant node.

FIG. 18 is a diagram illustrating a comparison of mechanisms for lossless delivery of UL data in a case of hop-by-hop RLCARQ.

FIG. 19 is a diagram illustrating options of "C) introduction of UL status delivery".

DESCRIPTION OF EMBODIMENTS

A cellular communication system according to an embodiment will be described with reference to the drawings. In the description of the drawings, the same or similar parts are denoted by the same or similar reference signs.

Configuration of Cellular Communication System

First, a configuration example of the cellular communication system according to an embodiment will be described. A cellular communication system 1 according to an embodiment is a 3GPP 5G system. Specifically, a radio access scheme in the cellular communication system 1 is New Radio (NR) being a radio access scheme of the 5G. Note that Long Term Evolution (LTE) may be at least partially applied to the cellular communication system 1. A future cellular communication system such as 6G may be applied as the cellular communication system 1.

Figure 1:
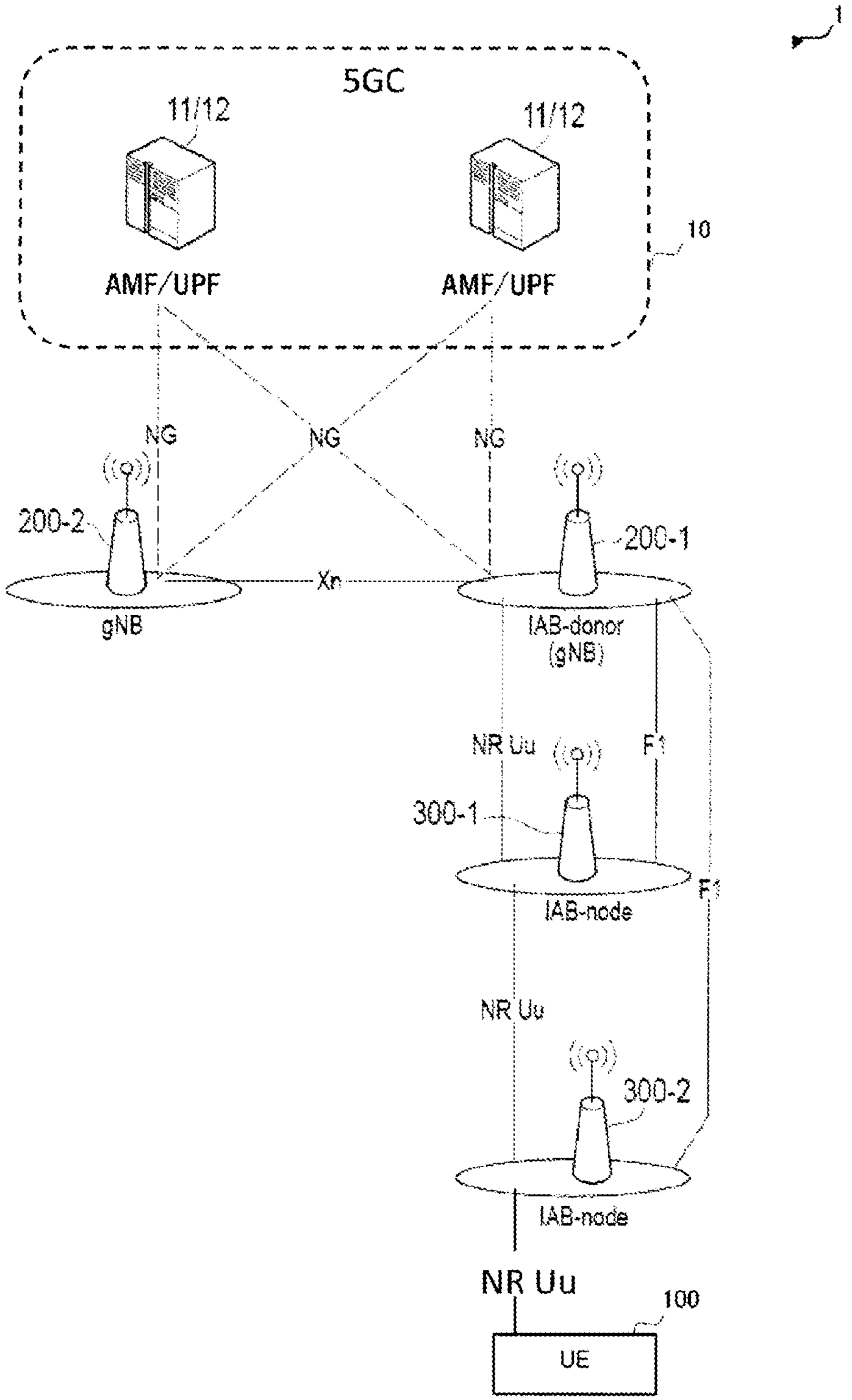
FIG. 1 is a diagram illustrating a configuration example of a cellular communication system according to an embodiment.

FIG. 1 is a diagram illustrating a configuration example of a cellular communication system 1 according to an embodiment.

As illustrated in FIG. 1, the cellular communication system 1 includes a 5G core network (5GC) 10, a User Equipment (UE) 100, base station apparatuses (hereinafter, may be referred to as "base stations") 200-1 and 200-2, and IAB nodes 300-1 and 300-2. Each base station 200 may be referred to as a gNB.

The following description focuses on an example in which each base station 200 is an NR base station; however, the base station 200 may be an LTE base station (i.e., an eNB).

Note that, in the following description, the base stations 200-1 and 200-2 may be referred to as the gNB 200 (or the base station 200), and the IAB nodes 300-1 and 300-2 may be referred to as the IAB node 300.

The 5GC 10 includes an Access and Mobility Management Function (AMF) 11 and a User Plane Function (UPF) 12. The AMF 11 is an apparatus that performs various types of mobility controls and the like for the UE 100. The AMF 11 communicates with the UE 100 by using Non-Access Stratum (NAS) signaling, and thereby manages information of an area in which the UE 100 exists. The UPF 12 is an apparatus that performs transfer control of user data and the like.

Each gNB 200 is a fixed wireless communication node and manages one or more cells. The term "cell" is used to indicate a minimum unit of a wireless communication area. The term "cell" may be used to indicate a function or a resource for performing wireless communication with the UE 100. One cell belongs to one carrier frequency. Hereinafter, the cell and the base station may be used without being distinguished from each other.

Each gNB 200 is interconnected to the 5GC 10 via an interface referred to as an NG interface. FIG. 1 illustrates two gNBs, namely a gNB 200-1 and a gNB 200-2 that are connected to the 5GC 10.

Each gNB 200 may be divided into a Central Unit (CU) and a Distributed Unit (DU). The CU and the DU are interconnected via an interface referred to as an F1 interface. The F1 protocol is a communication protocol between the CU and the DU and includes an F1-C protocol corresponding to a protocol for a control plane and an F1-U protocol corresponding to a protocol for a user plane.

The cellular communication system 1 supports an IAB that uses NR for the backhaul to enable wireless relay of NR access. The donor gNB 200-1 is a donor base station corresponding to a terminal node of the NR backhaul on the network end and including additional functions that support the IAB. The backhaul can implement multi-hop via a plurality of hops (i.e., a plurality of IAB nodes 300).

FIG. 1 illustrates an example in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that performs wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a laptop PC, a sensor or an apparatus that is provided in the sensor, a vehicle or an apparatus that is provided in the vehicle, or a flight vehicle or an apparatus that is provided in the flight vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
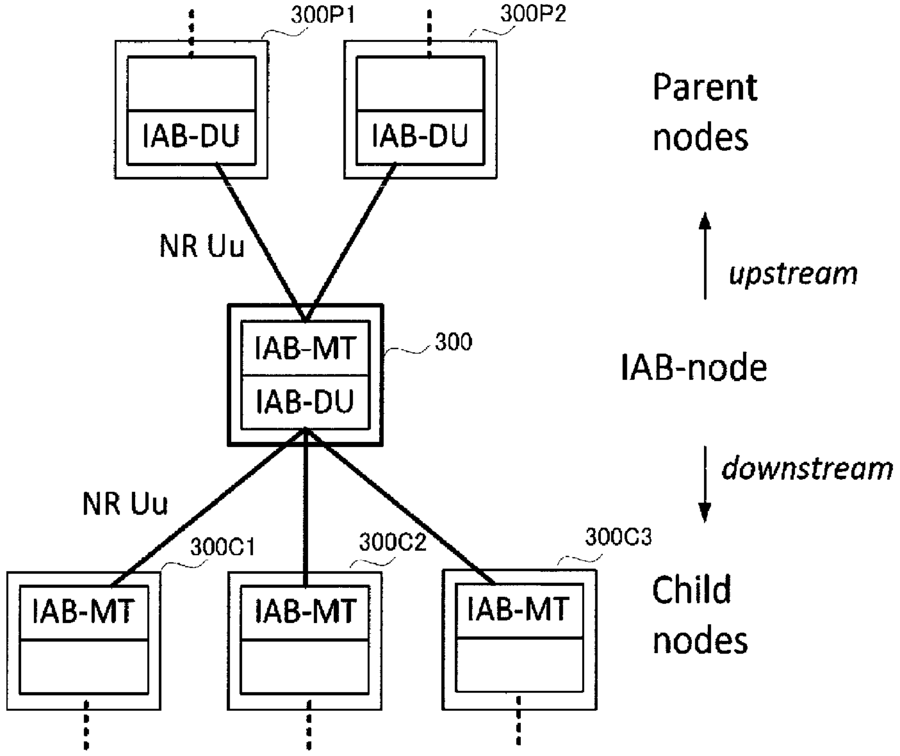
FIG. 2 is a diagram illustrating a relationship between an IAB node, Parent nodes, and Child nodes.

FIG. 2 is a diagram illustrating the relationship between the IAB node 300, the Parent nodes, and the Child nodes.

As illustrated in FIG. 2, each IAB node 300 includes an IAB-DU corresponding to a base station function unit and an IAB-Mobile Termination (MT) corresponding to a user equipment function unit.

Neighboring nodes on an NR Uu wireless interface of the IAB-MT (i.e., upper nodes) may be referred to as "parent nodes". The parent node is the DU of a parent IAB node or a donor gNB 200. A radio link between the IAB-MT and each parent node is referred to as a backhaul link (BH link). FIG. 2 illustrates an example in which the parent nodes of the IAB node 300 are IAB nodes 300P1 and 300P2. Note that the direction toward the parent nodes is referred to as upstream. Seen from the UE 100, upper nodes of the UE 100 can correspond to the parent nodes.

Neighboring nodes on an NR access interface of the IAB-DU (i.e., lower nodes) may be referred to as "child nodes". The IAB-DU manages cells in a manner the same as, and/or similar to the gNB 200. The IAB-DU terminates the NR Uu wireless interface connected to the UE 100 and the lower IAB nodes. The IAB-DU supports the F1 protocol for the CU of the donor gNB 200-1. FIG. 2 illustrates an example in which the child nodes of the IAB node 300 are IAB nodes 300-C1 to 300-C3; however, the child nodes of the IAB node 300 may include the UE 100. Note that the direction toward the child nodes is referred to as downstream.

Configuration of Base Station

Figure 3:
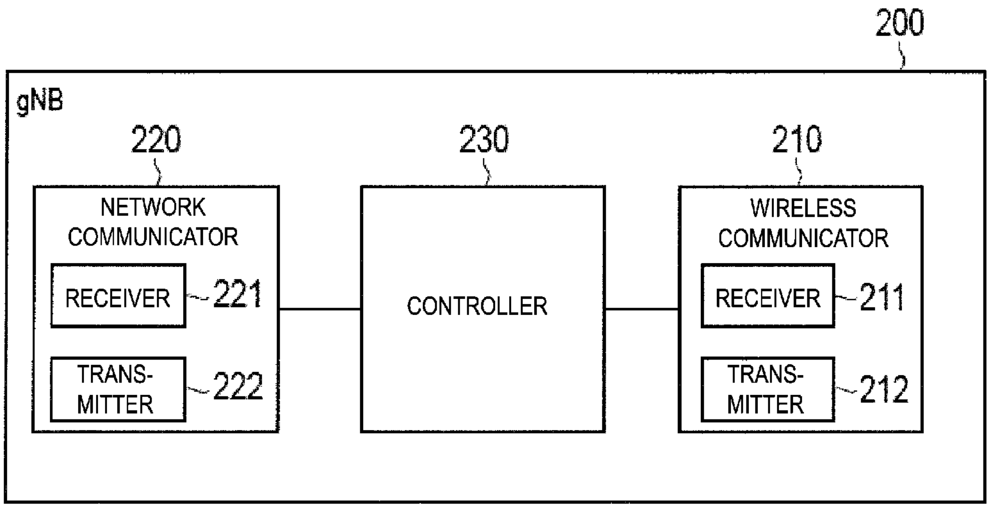
FIG. 3 is a diagram illustrating a configuration example of a base station (gNB) according to an embodiment.

In an embodiment, a configuration of the gNB 200 that is a base station will be described. FIG. 3 is a diagram illustrating a configuration example of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of reception under control of the controller 230. The receiver 211 includes an antenna, converts (down-converts) a radio signal received by the antenna into a baseband signal (reception signal), and outputs the baseband signal to the controller 230. The transmitter 212 performs various types of transmission under control of the controller 230. The transmitter 212 includes an antenna, converts (up-converts) a baseband signal (transmission signal) output by the controller 230 into a radio signal, and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of reception under control of the controller 230. The receiver 221 receives a signal from the outside and outputs the reception signal to the controller 230. The transmitter 222 performs various types of transmission under control of the controller 230. The transmitter 222 transmits a transmission signal output by the controller 230 to the outside.

The controller 230 performs various types of controls for the gNB 200. The controller 230 includes at least one memory and at least one processor electrically connected to the memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing. The processor performs processing of the layers described below. In each example described below, the controller 230 may perform each processing operation in the gNB 200.

Configuration of Relay Node

Figure 4:
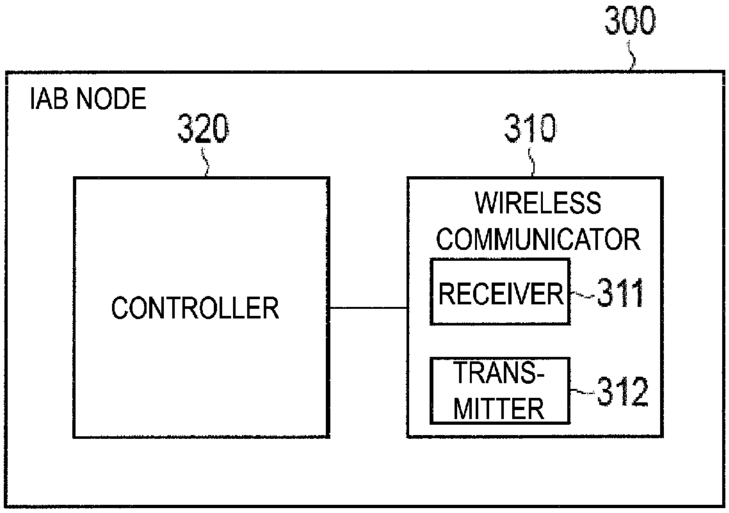
FIG. 4 is a diagram illustrating a configuration example of a relay node (IAB node) according to an embodiment.

A configuration of the IAB node 300 that is a relay node according to an embodiment (or a relay node apparatus. The relay node according to an embodiment may hereinafter be referred to as the "relay node") will be described. FIG. 4 is a diagram illustrating a configuration example of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. The wireless communicator 310 for the BH link communication and the wireless communicator 310 for the access link communication may be provided separately.

The wireless communicator 310 includes a receiver 311 and a transmitter 312. The receiver 311 performs various types of reception under control of the controller 320. The receiver 311 includes an antenna, converts (down-converts) a radio signal received by the antenna into a baseband signal (reception signal), and outputs the baseband signal to the controller 320. The transmitter 312 performs various types of transmission under control of the controller 320. The transmitter 312 includes an antenna, converts (up-converts) a baseband signal (transmission signal) output by the controller 320 into a radio signal, and transmits the radio signal from the antenna.

The controller 320 performs various types of controls in the IAB node 300. The controller 320 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 320 may perform each processing operation in the IAB node 300.

Configuration of User Equipment

Figure 5:
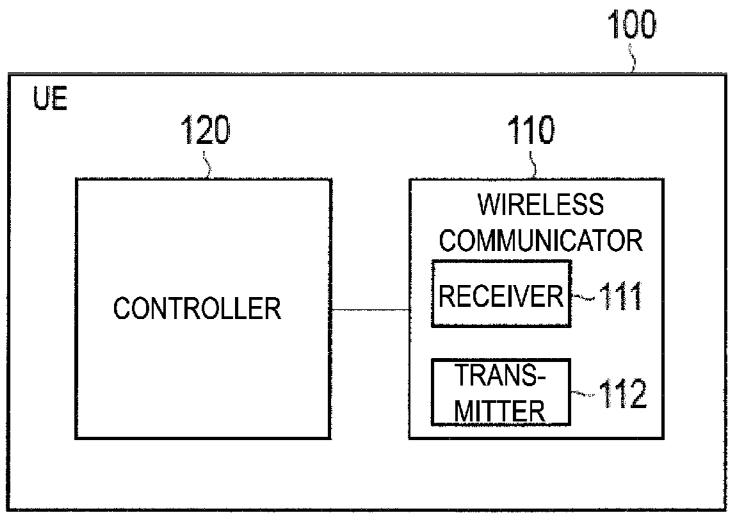
FIG. 5 is a diagram illustrating a configuration example of a user equipment (UE) according to an embodiment.

In an embodiment, a configuration of the UE 100 that is a user equipment will be described. FIG. 5 is a diagram illustrating a configuration of the UE 100. As illustrated in FIG. 5, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, that is, wireless communication with another UE 100. The wireless communicator 110 includes a receiver 111 and a transmitter 112. The receiver 111 performs various types of reception under control of the controller 120. The receiver 111 includes an antenna, converts (down-converts) a radio signal received by the antenna into a baseband signal (reception signal), and outputs the baseband signal to the controller 120. The transmitter 112 performs various types of transmission under control of the controller 120. The transmitter 112 includes an antenna, converts (up-converts) a baseband signal (transmission signal) output by the controller 120 into a radio signal, and transmits the radio signal from the antenna.

The controller 120 performs various types of control in the UE 100. The controller 120 includes at least one memory and at least one processor electrically connected to the memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing. The processor performs processing of the layers described below. In each example described below, the controller 130 may perform each processing operation in the UE 100.

Configuration of Protocol Stack

Figure 6:
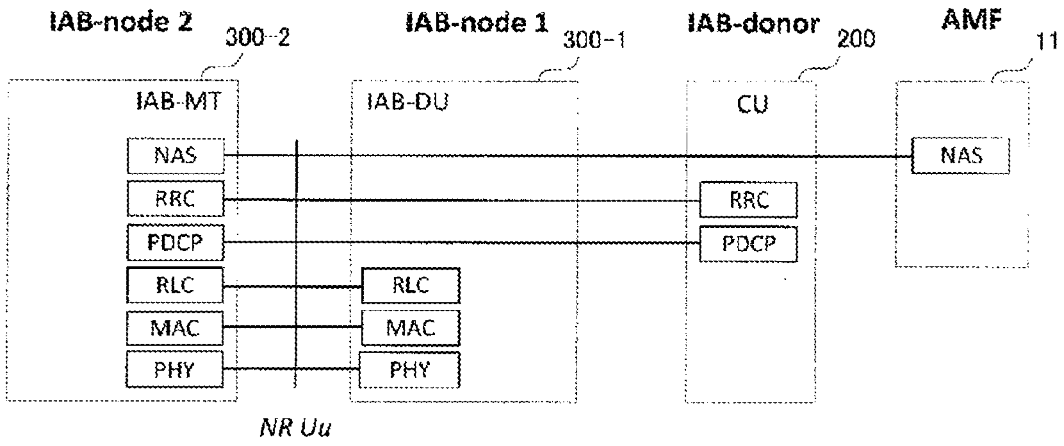
FIG. 6 is a diagram illustrating an example of a protocol stack related to an RRC connection and an NAS connection of IAB-MT.

In an embodiment, a configuration of a protocol stack will be described. FIG. 6 is a diagram illustrating an example of a protocol stack related to an RRC connection and an NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs preferential control of data, retransmission processing using a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, modulation and coding schemes (MCSs)) and resource blocks to be allocated, in the uplink and the downlink.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor gNB 200. With an RRC connection to the donor gNB 200, the IAB-MT is in an RRC connected state. With no RRC connection to the donor gNB 200, the IAB-MT is in an RRC idle state.

The NAS layer which is higher than the RRC layer performs session management, mobility management, and the like. NAS signaling is transmitted between the NAS layer of the IAB-MT of the IAB node 300-2 and the AMF 11.

Figure 7:
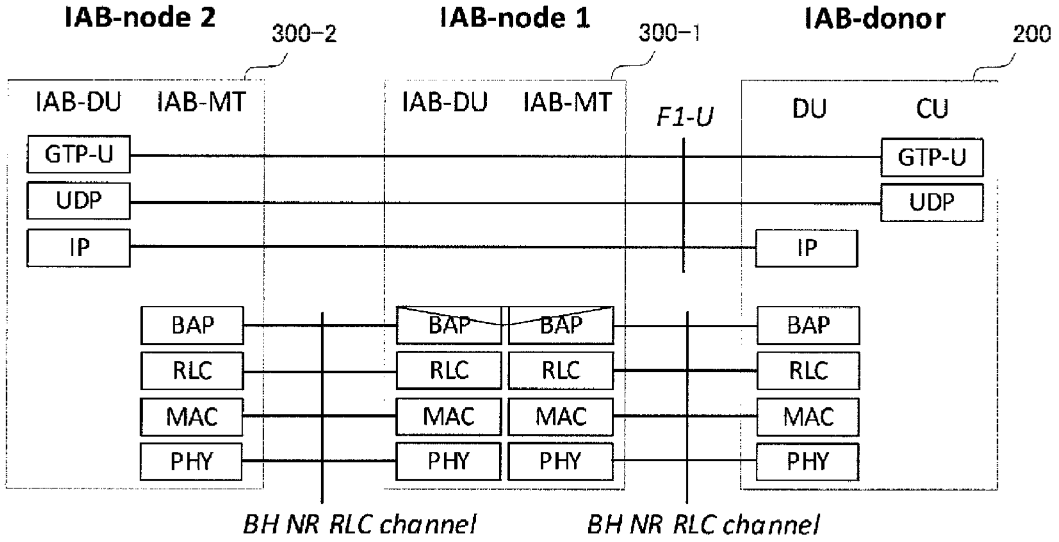
FIG. 7 is a diagram illustrating an example of a protocol stack related to an F1-U protocol.
Figure 8:
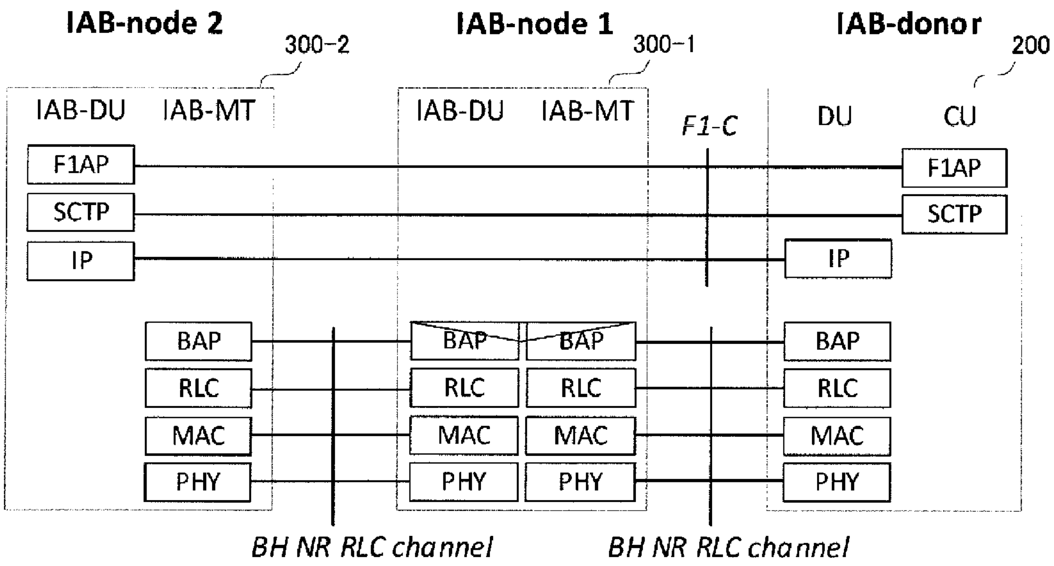
FIG. 8 is a diagram illustrating an example of a protocol stack related to an F1-C protocol.

FIG. 7 is a diagram illustrating a protocol stack related to an F1-U protocol. FIG. 8 is a diagram illustrating a protocol stack related to an F1-C protocol. Here, an example in which the donor gNB 200 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200 includes a Backhaul Adaptation Protocol (BAP)

layer as an upper layer of the RLC layer. The BAP layer is a layer that performs routing processing and bearer mapping and demapping processing. In the backhaul, the IP layer is transmitted via the BAP layer to allow routing through multiple hops.

In each backhaul link, Protocol Data Units (PDUs) of the BAP layer are transmitted by the backhaul RLC channel (BH NR RLC channel). Configuring multiple backhaul RLC channels in each BH link enables the prioritization and Quality of Service (QoS) control of traffic. The association between the BAP PDU and the backhaul RLC channel is performed by the BAP layer of each IAB node 300 and the BAP layer of the donor gNB 200.

As illustrated in FIG. 8, the protocol stack of the F1-C protocol includes an F1AP layer and a Stream Control Transmission Protocol (SCTP) layer, instead of a GTP-U layer and a UDP layer illustrated in FIG. 7.

Note that in the description below, processing or operation performed by the IAB-DU and the IAB-MT of the IAB may be simply described as processing or operation of the “TAB”. For example, in the description, the IAB-DU of the IAB 300-1 transmitting a message of the BAP layer to the IAB-MT of the IAB 300-2 is assumed to correspond to the IAB 300-1 transmitting the message to the IAB 300-2. Processing or operation of the DU or CU of the IAB donor 200 may be described simply as processing or operation of the “IAB donor”.

First Embodiment

In a first embodiment, an example will be described in which the IAB node 300 performs handover between the donor gNBs 200. Here, handover refers to, for example, an operation in which the IAB-MT in the RRC connected state switches connection to a cell. In the first embodiment, handover of the IAB node 300 is implemented between the donor gNBs 200. Such handover may be referred to as inter-donor IAB node handover (or inter-donor IAB node migration).

Figure 9:
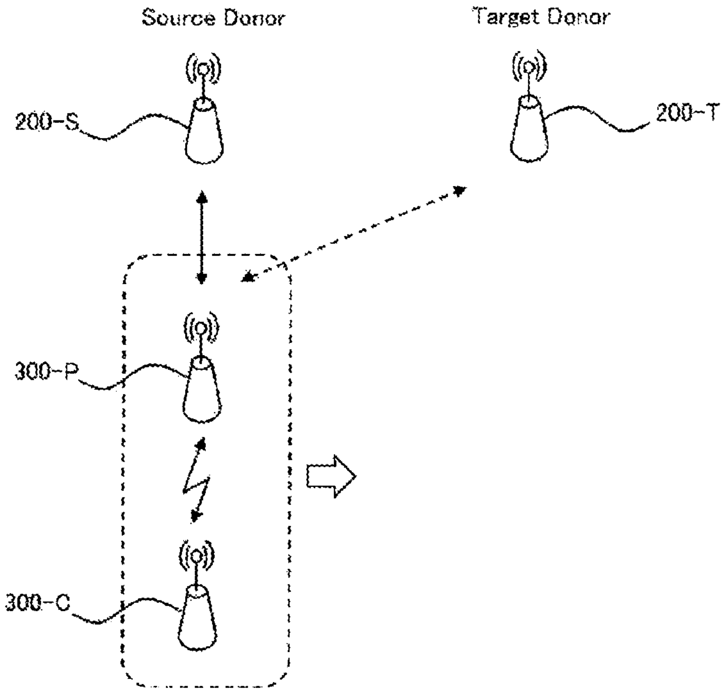
FIG. 9 is a diagram illustrating an example of handover.

FIG. 9 is a diagram illustrating an example of handover (or migration, which may hereinafter be referred to as “handover”) performed in the first embodiment.

As illustrated in FIG. 9, under the source donor gNB 200-S, the donor gNB 200-S and the IAB node 300-P are connected as a backhaul link. Under the control of the IAB node 300-P, the IAB node 300-P and the IAB node 300-C are connected as a backhaul link. Here, the IAB node 300-P may be referred to as a “Parent Node” (or an upper node), and the IAB node 300-C may be referred to as a “Child Node” (or a lower node). Note that the IAB node 300-C may be the UE 100.

In such a configuration, consider a case where the IAB node 300-P, which is a parent node, performs handover from the source donor gNB (which may hereinafter be referred to as the “source donor”) 200-S to the target donor gNB (which may hereinafter be referred to as the “target donor”) 200-T.

In this case, the IAB node 300-C corresponding to a child node also performs handover integrally with the IAB node 300-P corresponding to a parent node. The integral handover maintains a topology between the IAB nodes 300-P and 300-C.

However, the IAB node 300-C may fail to know at which timing the handover of the IAB node 300-P corresponding to the parent node is completed. Details will be described below. Accordingly, the IAB node 300-C may attempt to access the target donor 200-T via the IAB node 300-P corresponding to the parent node before the parent node IAB node 300-P completes the handover to the target donor 200-T. In this case, the access of the IAB node 300-C to the target donor 200-T fails because the handover of the IAB node 300-P to the target donor 200-T has not been completed.

In the first embodiment, when the handover from the source donor 200-S to the target donor 200-T is completed, the IAB node 300-P notifies the IAB node 300-C corresponding to a child node.

Specifically, firstly, the first relay node including the second relay node under the first relay node performs handover from the first donor base station to the second donor base station together with the second relay node. Secondly, upon completing the handover to the second donor base station, the first relay node transmits, to the second relay node, a notification indicating the completion of the handover.

Thus, the IAB node 300-C can recognize the completion of the handover of the IAB node 300-P corresponding to the parent node, and even when accessing the target donor 200-T is started, the IAB node 300-C can succeed in the access.

Figure 10:
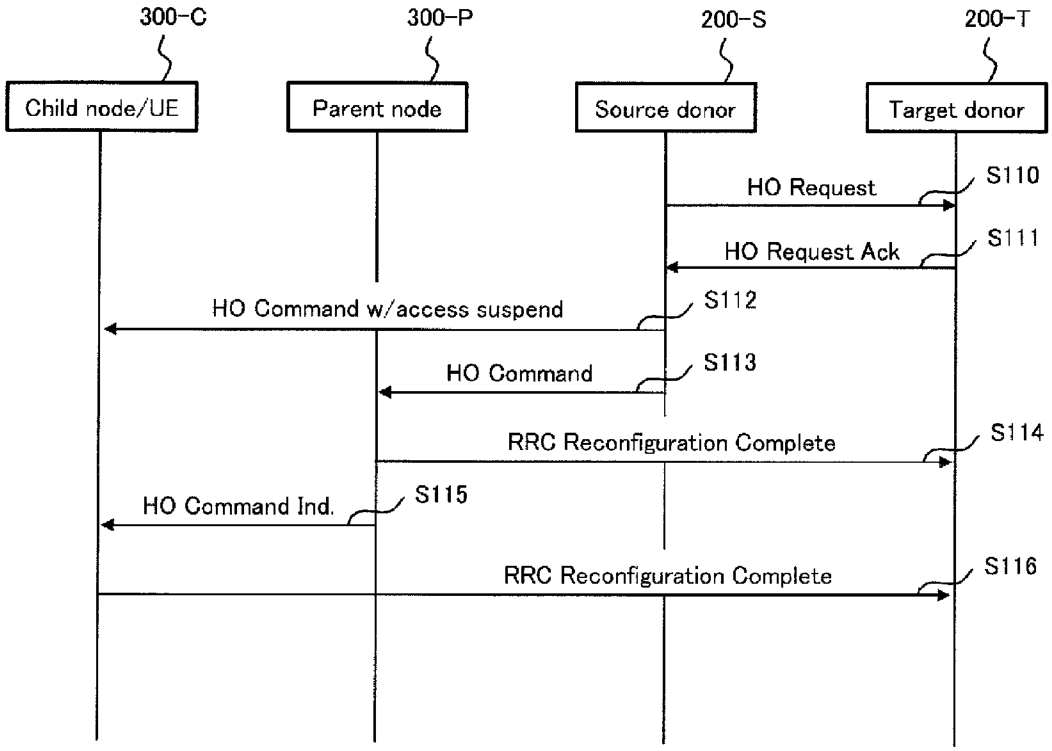
FIG. 10 is a diagram illustrating an operation example of the first embodiment.

FIG. 10 is a diagram illustrating an operation example of the first embodiment.

Note that in FIG. 10, for example, “Source donor” is the source donor 200-S, and “Target donor” is the target donor 200-T. In FIG. 10, for example, “Parent node” is the IAB node 300-P, and “Child node” is the IAB node 300-C. Hereinafter, “Parent node” may be referred to as the upper node 300-P, and “Child node” may be referred to as the lower node 300-C. Note that the lower node 300-C may be the UE 100 instead of the IAB node.

In FIG. 10, before the processing is started, the source donor 200-S and the upper node 300-P are assumed to be in the RRC connected state, and the source donor 200-S and the lower node 300-C are also assumed to be in the RRC connected state. Also in the other embodiments described below, the components are assumed to be in the same and/or similar states before the processing is started.

In step S110, the source donor 200-S transmits a handover request (HO Request) message to the target donor 200-T.

In step S111, the target donor 200-T transmits, to the source donor 200-S, a handover request acknowledgement (HO Request Ack) message being an acknowledgement in response to the handover request.

In step S112, the source donor 200-S transmits a handover command (HO Command) message toward the lower node 300-C. The handover command message is, for example, a message instructing handover from the source donor 200-S to the target donor 200-T. The handover command message is a type of RRC Reconfiguration. The handover command message is transmitted to the lower node 300-C via the upper node 300-P.

Here, the handover command message may include an indicator instructing that access to the target donor 200-T is to be suspended. An example of such an indicator is “access suspend” as illustrated in FIG. 10. The handover command message may include, instead of the indicator, configuration information indicating that the access to the target donor 200-T is to be suspended. Reception of the handover command message including the indicator or the configuration information as described above allows the lower node 300-C to suspend the access to the target donor 200-T.

In step S113, the source donor 200-S transmits a handover command message to the upper node 300-P. Here, the handover command message may include a configuration indicating whether to notify the lower node 300-C when the handover is completed. Such a configuration may be performed using, for example, the above-described configuration information or indicator.

In step S114, the upper node 300-P performs handover from the source donor 200-S to the target donor 200-T and starts accessing the target donor 200-T. In other words, the upper node 300-P transmits an RRC Reconfiguration Complete message to the target donor 200-T. The RRC Reconfiguration Complete message may be an access message or an access signal to the target donor 200-T.

When the access to the target donor 200-T is successful, in step S115, the upper node 300-P notifies the lower node 300-C that the access is successful. Such a notification may be performed by a BAP Control PDU and/or System Information Block (SIB) 1. Alternatively, the notification may indicate that the upper node 300-P has completed the handover to the target donor 200-T. Alternatively, the notification may indicate permission to start accessing the target donor 200-T.

Note that, when the access to the target donor 200-T fails (i.e., Handover Failure (HOF)), the upper node 300-P may transmit, to the lower node 300-C, a notification indicating the failure in the access. In this case, in response to receiving the notification, the lower node 300-C may delete the received handover command message (step S112). The upper node 300-P or the lower node 300-C may transmit, to the source donor 200-S, a notification indicating the failure in the access. The notification may include information (Cause) indicating that the cause is the failure of the upper node 300-P in the access. With the notification, the source donor 200-S may recognize that the upper node 300-P has failed in accessing the target donor 200-T, and cancel the handover processing of the upper node 300-P and/or the lower node 300-C. For example, the source donor 200-S may cancel the handover command. Alternatively, the source donor 200-S may transmit a notification of handover cancellation to the target donor 200-T.

In step S116, the lower node 300-C starts accessing the target donor 200-T. In other words, the lower node 300-C transmits the RRC Reconfiguration Complete message to the target donor 200-T. The message is transferred at the upper node 300-P and transmitted to the target donor 200-T.

For example, when receiving no notification (step S115) from the upper node 300-P, the lower node 300-C fails to recognize at what timing the handover of the upper node 300-P is completed. Accordingly, the lower node 300-C may transmit the RRC Reconfiguration Complete message before step S114 illustrated in FIG. 10 (or before the handover of the upper node 300-P is completed). In this case, the upper node 300-P has not completed the handover to the target donor 200-T, and thus the RRC Reconfiguration Complete message transmitted from the lower node 300-C does not reach the target donor 200-T.

In the first embodiment, as described above, the lower node 300-C can suspend the access to the target donor 200-T by step S112, and can recognize completion of the handover of the upper node 300-P by step S115. Accordingly, the lower node 300-C accesses the target donor 200-T after the handover of the upper node 300-P is completed, and can thus access the target donor 200-T.

Second Embodiment

In the first embodiment, the example of handover using the handover command message has been described. The second embodiment is an example in which conditional handover is performed. Also in the example of the second embodiment, when the handover processing of the upper node 300-P is completed, the lower node 300-C starts accessing the target donor 200-T.

The conditional handover will be described. The conditional handover is handover performed when one or more handover execution conditions (or trigger conditions) are met. The configuration of the conditional handover includes configurations of candidate cells for the conditional handover and trigger conditions. The configuration of the conditional handover may include a plurality of combinations of configurations of candidate cells and trigger conditions.

In a typical handover, the UE 100 reports, to the gNB 200, the measured value of the radio state of the serving cell and/or a neighbor cell, and based on this report, the gNB 200 determines the handover to the neighbor cell and transmits a handover instruction to the UE 100. Accordingly, when the radio state of the serving cell is rapidly degraded, in the typical handover, communication breakdown may occur before the handover is performed. In contrast, in the conditional handover, when a preconfigured trigger condition is satisfied, a handover to the candidate cell corresponding to the trigger condition can autonomously be performed. Accordingly, problems with the typical handover such as communication disruption can be solved.

Figure 11:
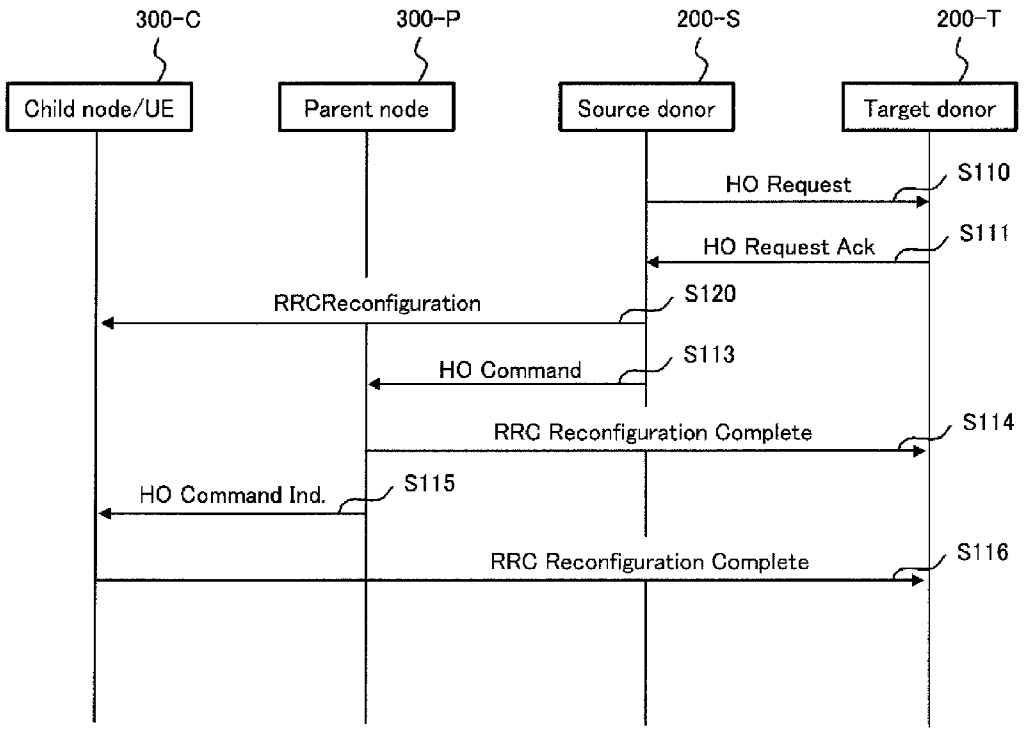
FIG. 11 is a diagram illustrating an operation example of a second embodiment.

FIG. 11 is a diagram illustrating an operation example of the second embodiment.

Step S110 and step S111 are the same as, and/or similar to, those in the first embodiment.

In step S120, the source donor 200-S configures conditional handover for the lower node 300-C. In the example of FIG. 11, the source donor 200-S transmits, to the lower node 300-C, an RRC Reconfiguration message including configuration information for the conditional handover. The configuration information for the conditional handover includes the trigger condition "the time when the upper node completes the handover". In other words, the lower node 300-C executes the handover of the lower node 300-C at, as the trigger condition, the time when the upper node 300-P completes the handover. Alternatively, the trigger condition may include "the time when the lower node 300-C receives a notification from the upper node". In other words, the lower node 300-C executes the handover of the lower node 300-C at, as the trigger condition, the time when the lower node 300-C receives the notification from the upper node 300-P. In the execution of the conditional handover based on the trigger condition, the lower node 300-C is to select, as a target, a cell managed by the upper node 300-P. Alternatively, the lower node 300-C is to select the same cell as the current serving cell. This enables access to the target donor 200-T with the relationship between the upper node 300-P and the lower node 300-C maintained.

In step S113, the source donor 200-S transmits a handover command message to the upper node 300-P.

In step S114, the upper node 300-P performs handover and transmits the RRC Reconfiguration Complete message to start accessing the target donor 200-T.

In step S115, the upper node 300-P notifies the lower node 300-C. The notification in the example of FIG. 11 corresponds to the same notification as in the first embodiment. The notification may indicate the completion of the handover or indicate permission to start accessing the target donor 200-T.

In step S116, the lower node 300-C starts accessing the target donor 200-T in accordance with the configuration of the conditional handover (or trigger condition) received in step S120. The trigger condition in this case includes, for example, "the time when the upper node completes the handover". The notification in step S115 satisfies the trigger condition "the time when the upper node completes the handover". Accordingly, the lower node 300-C transmits the RRC Reconfiguration Complete message toward the target donor 200-T. The RRC Reconfiguration Complete message is transferred at the upper node 300-P and transmitted to the target donor 200-T.

As described above, even in the conditional handover, receiving the notification of the handover completion or the like from the upper node 300-P allows the lower node 300-C to recognize the handover completion at the upper node 300-P. Thus, for example, as in the first embodiment, the lower node 300-C can access the target donor 200-T.

Third Embodiment

In the first and second embodiments, receiving, from the upper node 300-P, a notification (step S115 in FIG. 10 or FIG. 11) indicating completion of the handover or the like allows the lower node 300-C to recognize that the upper node 300-P has completed the handover.

However, the lower node 300-C may fail to receive such a notification as in the following cases, for example. Specifically, when the lower node 300-C is a UE 100 corresponding to "Release 17" of the 3GPP, the lower node 300-C can receive such a notification. However, when the lower node 300-C is a UE 100 corresponding to "Release 15" or "Release 16", the lower node 300-C fails to receive such a notification.

In the third embodiment, even when the lower node 300-C fails to receive the notification from the upper node 300-P, the lower node 300-C can access the target donor 200-T.

Specifically, firstly, the first relay node including the second relay node under the first relay node performs handover from the first donor base station to the second donor base station together with the second relay node. Secondly, upon completing the handover to the second donor base station, the first relay node transmits, to the second donor base station, the access message for the second donor base station received from the second relay node.

Figure 12:
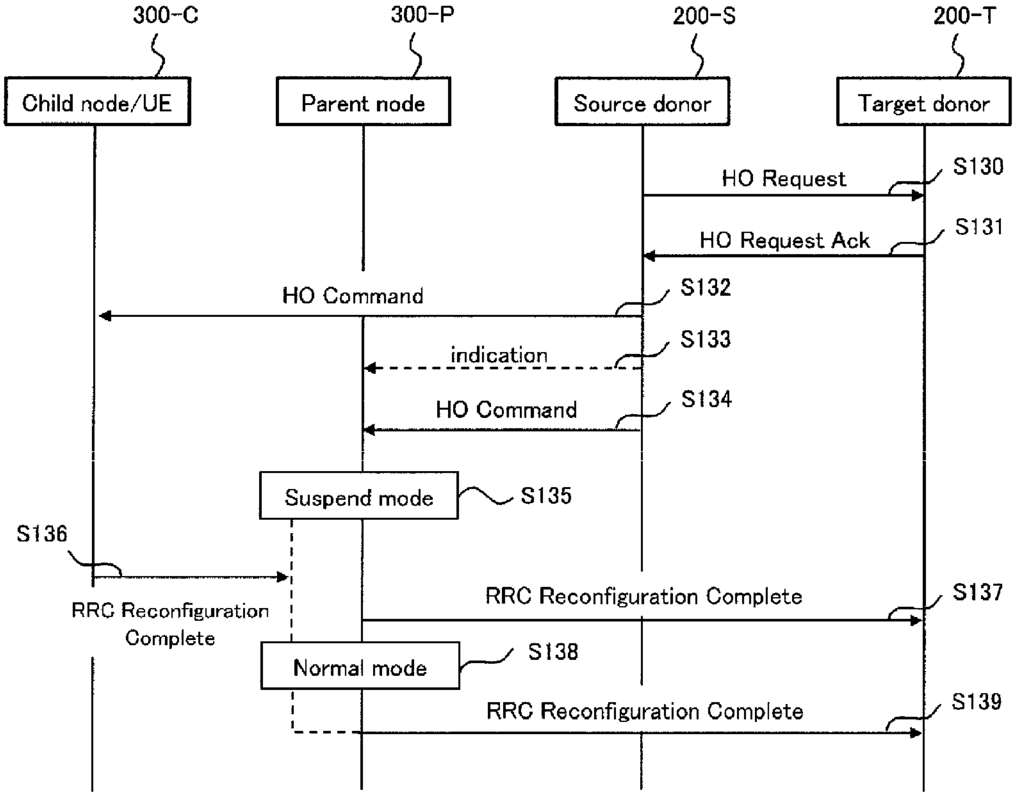
FIG. 12 is a diagram illustrating an operation example of the third embodiment.

FIG. 12 is a diagram illustrating an operation example of the third embodiment.

Step S130 and step S131 are the same as step S110 and step S111 in the first and second embodiments, respectively.

In step S132, the source donor 200-S transmits the handover command message toward the lower node 300-C. The message is transmitted to the lower node 300-C via the upper node 300-P.

Here, in step S133, the source donor 200-S may transmit, to the upper node 300-P, a notification ("indication" in FIG. 12) indicating that the handover command message has been transmitted to the lower node 300-C. The notification to the upper node 300-P may simply instruct entry into a transfer suspension mode. In this case, the upper node 300-P receives the notification and enters the transfer suspension mode ("Suspend mode"). The notification in step S133 may be transmitted prior to step S132. In this case, the notification to the upper node 300-P may indicate that a handover command message is to be transmitted to the lower node 300-C or may simply instruct entry into the transfer suspension mode.

In step S134, the source donor 200-S transmits the handover command message to the upper node 300-P. Note that step S134 may be executed after the entry into the transfer suspension mode when the notification in step S133 has been received. The handover message may include the notification in step S133. In this case, step S133 may be omitted.

In step S135, upon reception of the handover command from the source donor 200-S, the upper node 300-P enters the transfer suspension mode.

In the transfer suspension mode, the upper node 300-P suspends the transfer of the RRC message transmitted from the lower node 300-C (or stops the transmission of the RRC message transmitted from the lower node 300-C). Accordingly, the upper node 300-P can suspend the RRC Reconfiguration Complete message transmitted from the lower node 300-C.

For example, the two methods described below are available for suspending the RRC message.

Method 1: Suspends a specific BH RLC Channel (or stops transmission). Note that, the condition for Method 1 is that the source donor 200-S is configured to map a Signaling Radio Bearer (SRB) of the lower node 300-C to the BH RLC Channel to be suspended. In order to perform such mapping, the source donor 200-S may transmit, to the upper node 300-P, information regarding the specific BH RLC Channel to be suspended. The upper node 300-P can decipher packets transmitted from the lower node 300-C to identify the RRC message and suspend the RRC message.

Method 2: Suspends all packet transfer in an upstream direction. In this case, the upper node 300-P suspends all BH RLC Channels in the upstream direction. In other words, the upper node 300-P can suspend both the SRB and a Data Radio Bearer (DRB) to suspend the RRC Reconfiguration Complete message from the lower node 300-C.

In step S136, with the suspension described above, the upper node 300-P suspends, in the transfer suspension mode, the transfer of the RRC Reconfiguration Complete message transmitted from the lower node 300-C.

In step S137, the upper node 300-P performs handover and transmits the RRC Reconfiguration Complete message to start accessing the target donor 200-T.

In step S138, upon completion of the handover, the upper node 300-P shifts from the transfer suspension mode to the normal mode ("Normal mode").

Due to transitioning to the normal mode, in step S139, the upper node 300-P transmits, to the target donor 200-T, the RRC Reconfiguration Complete message, transmitted from the lower node 300-C and suspended.

Fourth Embodiment

The fourth embodiment is an example in which group handover is performed.

Figure 13:
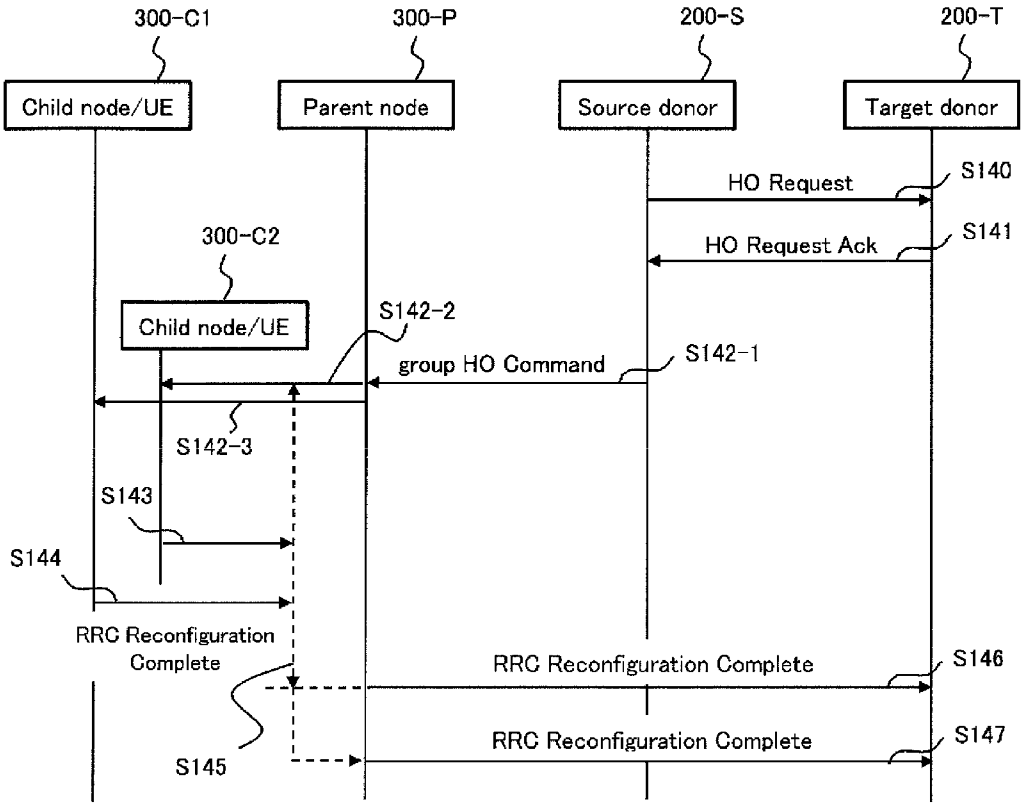
FIG. 13 is a diagram illustrating an operation example of a fourth embodiment.

FIG. 13 is a diagram illustrating an operation example of the fourth embodiment. FIG. 13 illustrates the following configuration example.

Specifically, two lower nodes 300-C1 and 300-C2 each establish a BH link to one upper node 300-P, and are in the RRC connected state. The group handover is, for example, handover from the source donor 200-S to the target donor 200-T for one upper node 300-P and a plurality of lower nodes 300-C1 and 300-C2. FIG. 13 illustrates an example in which two lower nodes 300-C1 and 300-C2 exist. The plurality of lower nodes 300-C1 and 300-C2 may be referred to as a lower node group.

In such a configuration, also in the fourth embodiment, the upper node 300-P suspends transfer of the RRC Reconfiguration Complete message transmitted from each of the plurality of lower nodes 300-C1 and 300-C2. When the handover to the target donor 200-T is completed, the upper node 300-P transmits, to the target donor 200-T, the RRC Reconfiguration Complete message, received from each of the lower nodes 300-C1 and 300-C2 and suspended. Thus, even in the group handover, the lower nodes 300-C1 and 300-C2 can access the target donor 200-T as in the first embodiment.

As illustrated in FIG. 13, in step S140, the source donor 200-S transmits a handover request message to the target donor 200-T. The handover request message may include a request indicating that group handover is to be performed.

In step S141, the target donor 200-T transmits a handover request acknowledgement message to the source donor 200-S.

In step S142-1, the source donor 200-S transmits a group handover command (group HO Command) message to the upper node 300-P.

In step S142-2, the upper node 300-P transfers the group handover command to the lower node 300-C2. Furthermore, in step S142-3, the upper node 300-P transfers the group handover command to the lower node 300-C1.

The group handover command may include information indicating that normal handover (handover of the IAB node 300-P) and handover of the lower node group (lower nodes 300-C1 and 300-C2) are to be performed at the same time. In this case, the upper node 300-P may directly transfer, to the lower nodes 300-C1 and 300-C2, the group handover command received from the source donor 200-S. Alternatively, the group handover command may include both the configuration of the upper node 300-P and the configuration of the lower nodes 300-C1 and 300-C2. In this case, the upper node 300-P may transfer the group handover command to the lower nodes 300-C1 and 300-C2 with the configurations of the lower nodes 300-C1 and 300-C2 extracted or without modifying the configurations of the lower nodes 300-C1 and 300-C2.

Note that in FIG. 13, step S142-2 is followed by step S142-3 but that the order may be reversed. Step S142-2 and step S142-3 may be performed simultaneously.

In step S143, the lower node 300-C2 transmits the RRC Reconfiguration Complete message to start accessing the target donor 200-T.

In step S144, the lower node 300-C1 transmits the RRC Reconfiguration Complete message to start accessing the target donor 200-T.

Until the upper node 300-P starts accessing the target donor 200-T, the upper node 300-P suspends the transfer, to the target donor 200-T, of the RRC Reconfiguration Complete messages received from the lower nodes 300-C1 and 300-C2, and holds these messages (step S145). The transfer suspension may be performed by the "transfer suspension mode" as in the third embodiment.

In step S146, the upper node 300-P transmits the RRC Reconfiguration Complete messages to the target donor 200-T to start accessing the target donor 200-T.

In step S147, the upper node 300-P completes the handover to the target donor 200-T, and thus transfers, to the target donor 200-T, the RRC Reconfiguration Complete messages received from the lower nodes 300-C1 and 300-C2 and suspended. In this case, the upper node 300-P may aggregate, into one message, the RRC Reconfiguration Complete messages for which the transfer has been suspended and transmit the message, or may transfer each of the RRC Reconfiguration Complete messages. The one aggregated message may be an RRC Group Reconfiguration Complete message. Alternatively, the upper node 300-P may include, in the RRC Reconfiguration Complete message of the upper node 300-P (step S146), the RRC Reconfiguration Complete messages for which the transfer has been suspended, and transmit the resultant one message. The one message in this case may also be the RRC Group Reconfiguration Complete message.

In the example of the fourth embodiment described above, the two IAB nodes 300-C1 and 300-C2 are used as lower nodes. Three or more IAB nodes may exist as child nodes of the upper node 300-P.

Fifth Embodiment

In the fifth embodiment, a path to the source donor 200-S is maintained for a certain period of time even after handover of the upper node 300-P to the target donor 200-T.

For example, even with specific data or message to be transmitted to the source donor 200-S, handover may preclude the lower node 300-C from transmitting the data or message to the source donor 200-S.

In the fifth embodiment, the upper node 300-P maintains the path to the source donor 200-S for a certain period of time even after the handover. Thus, for example, the lower node 300-C can transmit specific data or the like to the source donor 200-S even after the handover.

Figure 14:
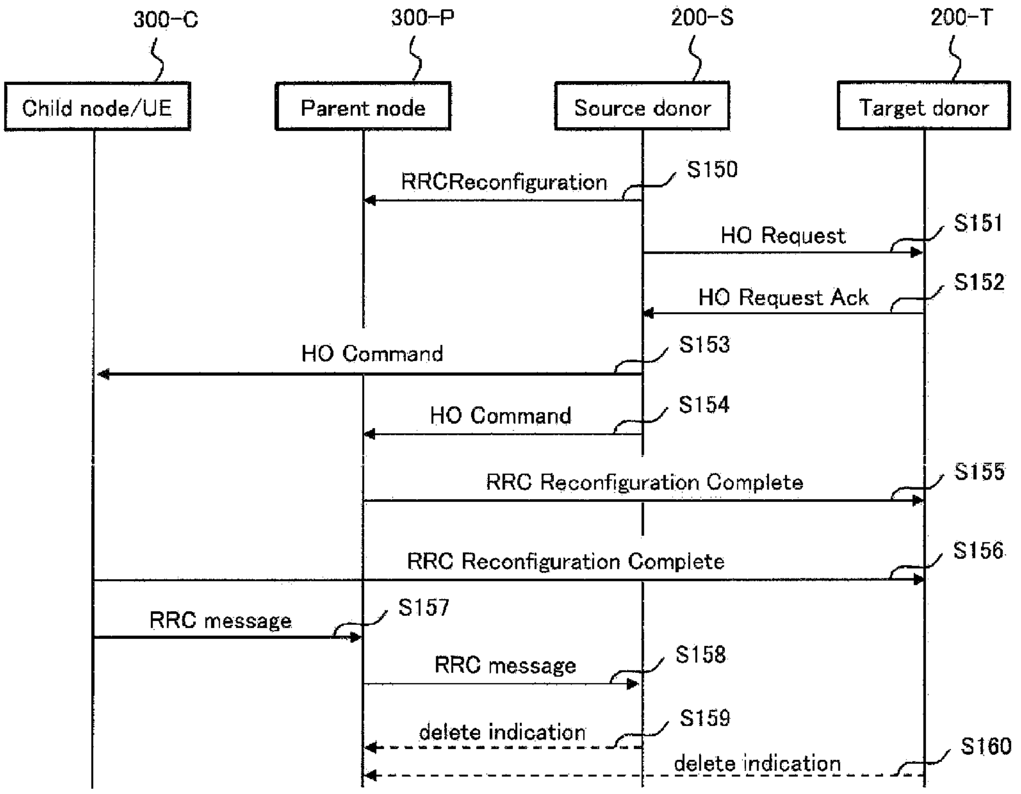
FIG. 14 is a diagram illustrating an operation example of a fifth embodiment.

FIG. 14 is a diagram illustrating an operation example of the fifth embodiment.

In step S150, the source donor 200-S provides configuration for the upper node 300-P in such a manner that the path with the source donor 200-S remains even after the handover. In the example of FIG. 14, the source donor 200-S provides the configuration by transmitting, to the upper node 300-P, the RRC Reconfiguration message including the configuration. The configuration includes at least any one of the following pieces of information:

1) Routing configuration to be maintained after the handover,
2) BH RLC Channel ID to be maintained after the handover, and
3) Valid period of the path to be maintained after the handover.

Note that the RRC Reconfiguration message in step S150 may be transmitted simultaneously with the handover command in the subsequent stage (step S154) or may be included in the handover command. FIG. 14 illustrates an example in which the RRC reconfiguration message including the configuration is transmitted before the handover command.

Step S151 and step S152 are the same as step S110 and step S111 in the first embodiment, respectively.

In step S153, the source donor 200-S transmits the handover command message to the lower node 300-C. In step S154, the source donor 200-S transmits the handover command message to the upper node 300-P.

In step S155, the upper node 300-P performs handover processing and transmits the RRC Reconfiguration Complete message to the target donor 200-T to start accessing the target donor 200-T. At this time, the upper node 300-P leaves the path with the source donor 200-S based on the configuration in step S150. Specifically, the upper node 300-P performs the following based on the configuration:

4) Maintains connection to the corresponding cell,
5) Maintains the corresponding BH RLC Channel, and
6) Maintains the corresponding routing configuration. In 4) to 6) described above, "Does not delete" may be used instead of "Maintains".

In step S156, the lower node 300-C starts accessing the target donor 200-T. In this case, the lower node 300-C may perform the access after the upper node 300-P completes the handover processing based on the notification according to the first embodiment. Alternatively, the upper node 300-P may, by the transfer suspension mode according to the third embodiment, suspend the transfer of the RRC Reconfiguration Complete message received from the lower node 300-C until the handover of the upper node 300-P is completed, and transfer the message after completion of the handover.

In step S157, the upper node 300-P receives the specific packets (in the example of FIG. 14, the RRC message for the source donor 200-S) transmitted from the lower node 300-C.

At this time, the upper node 300-P performs routing processing and transfer processing based on 4) to 6) described above and maintained in step S155. In step S158, the upper node 300-P utilizes the path to the source donor 200-S to transfer, to the source donor 200-S, the RRC message received from the lower node 300-C. In this case, the upper node 300-P may utilize the path to the source donor 200-S to transfer, to the lower node 300-C, specific packets received from the source donor 200-S.

The source donor 200-S or the target donor 200-T may transmit, to the upper node 300-P, a delete instruction to delete a configuration for leaving the path (step S159, step S160). For example, the source donor 200-S or the target donor 200-T may transmit the delete instruction when the lower node 300-C completes all of the handover processing.

Other Embodiments

A program causing a computer to execute each of the processes performed by the UE 100 or the gNB 200 may be provided. The program may be recorded on a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Although an embodiment has been described in detail with reference to the drawings, a specific configuration is not limited to those described above, and various design changes and the like can be made without departing from the gist. All of or a part of the examples can be combined together as long as the combination remains consistent.

Supplementary Note

Introduction

A revised work item related to NR Enhancements to Integrated Access AND Backhaul (NR eIAB) was approved. Some of the purposes thereof are as follows.

Enhancements of Topology Adaptation
- Specification of procedures for inter-donor IAB-node migration to enhance robustness and load-balancing, including enhancements to reduce signaling load.
- Specification of enhancements to reduce service interruption due to IAB-node migration and BH RLF recovery.
- Specification of enhancements to topology redundancy, including support for CP/UP separation.

Enhancements of Topology, Routing, and Transport.
- Specification of enhancements to improve topology-wide fairness, multi-hop latency, and congestion mitigation.

In Supplementary Notes, a matter to be considered regarding the topology adaptation enhancements of a Rel-17 eIAB will be discussed from the viewpoint of assumption of backhaul link quality, enhancements of BH RLF indication, BH RLF recovery and cell (re)selection, and enhancements of lossless delivery.

Discussion

Assumption of Backhaul Link Quality

In the stage of research of Rel-15, as one background of the requirements, TR states the following: "Radio backhaul links are vulnerable to obstructions caused by a moving object such as a vehicle, change of seasons (leaves), change of infrastructure (new buildings), and the like. Such vulnerabilities also apply to physically stationary IAB nodes." Thus, as has been captured in TR, various problems caused by multi-hop/radio backhaul and potential solutions for the problems were researched.

Finding 1: In the research of Rel-15, various problems caused by unstable backhaul links and potential solutions for the problems were identified, which were fully captured in TR 38.874.

In normative work of Rel-16, it was assumed that the IAB nodes are motionless, that is, "stationary IAB nodes". Accordingly, the backhaul (BH) was sufficiently stable in appropriately designed deployment even in a case of a backhaul link via millimeter waves and/or a local area IAB node that may be deployed with an unmanaged method. Thus, only a recovery procedure combined with basic functions of the BH RLF was defined. The basic functions are existing functions such as BH RLF indication (also known as Type 4 that is "Recovery failure") and RRC reestablishment, MCG/SCG failure indication, and/or a conditional handover.

Finding 2: In a Rel-16 IAB, only a stationary IAB node including a sufficiently stable backhaul link was assumed.

In enhancements of Rel-17, one intended use case is a "mobile IAB node", which may be a part of "inter-donor IAB-node migration" even if not explicitly described in WID. Furthermore, secondary purposes in WID such as "enhancements for reducing service interruptions due to IAB-node migration and BH RLF recovery" and "enhancements for topology redundancy" clearly intend that the BH link becomes unstable, for example, due to obstruction by millimeter waves, and the migration and BH RLFs frequently occur in the scenario of Rel-17 deployment. Therefore, according to the discussion of Rel-17, first, RAN2 should have common understanding about assumption of the BH link.

Proposal 1: RAN2 should assume that quality of the backhaul link dynamically changes. Thus, a backhaul RLF is not a rare case in the Rel-17 eIAB.

Enhancements of BH RLF Indication Additional Indications (Type 2 and Type 3) In email discussion in Rel-16, four types of BH RLF notifications as illustrated in FIG. 15 were discussed.

Ultimately, only "Recovery failure" corresponding to Type 4 was defined as the BH RLF indication in Rel-16. This allows a child IAB-MT to recognize an RLF on the BH link to initiate an RLF recovery procedure.

Finding 3: In Rel-16, only "Recovery failure" corresponding to Type 4 was defined as the BH RLF indication.

On the other hand, many companies still find other types of indications beneficial, and thus this was further discussed via email. Eight out of thirteen companies preferred introduction of "Trying to recover" corresponding to Type 2, and other two companies thought this would be discussed in Rel-17. Therefore, in conclusion, most companies are ready for introduction of the Type 2 Indication into Rel-17. Even when the Type 2 Indication can be introduced, a method for transmitting the Type 2 Indication requires further study; the method may include using the BAP Control PDU, the SIB1, or both of these. Note that Type 1 and Type 2 have the same meaning.

Proposal 2: RAN2 should agree with the fact that "Trying to recover" corresponding to Type 2 of the BH RLF indication has been introduced. Whether the transmission is performed using the BAP Control PDU, the SIB1, or both of these requires further study.

Nine out of thirteen companies agreed to hold a discussion on "BH link recovered" corresponding to Type 3 in Rel-17 as well. When the Type 2 Indication is introduced as in Proposal 2, and the parent BH link recovers successfully, notification to the IAB-MT/UE is very easy.

Figure 16:
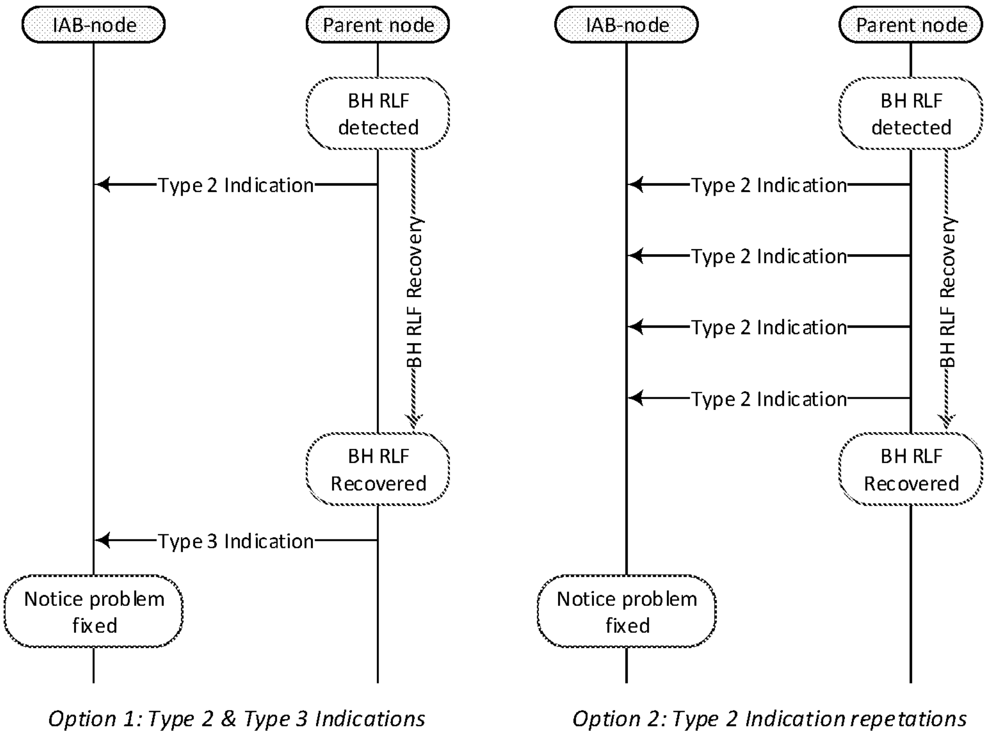
FIG. 16 is a diagram illustrating transmission options for an enhanced BH RLF indication.

However, whether such an explicit indication is really needed should be studied. For example, for the Type 2 Indication transmitted via the SIB1, the indication is no longer broadcast when the BH link is not under the RLF (i.e., "recovered") as illustrated in Option 2 in FIG. 16. Therefore, downstream IAB nodes and the UE recognize whether the BH link has been recovered based on the absence of the Type 2 Indication in the SIB 1. As a matter of course, when the Type 3 Indication is transmitted via the BAP Control PDU, it has an advantage that the downstream IAB nodes can promptly know that the BH link has been recovered. However, the UE includes no BAP layer and thus disadvantageously fails to recognize the recovery. Therefore, RAN2 should study whether the Type 3 Indication is really necessary.

Proposal 3: When Proposal 2 can be agreed on, RAN2 should study whether to introduce an explicit BH RLF indication, that is, "BH link recovered" corresponding to Type 3, the indication being provided when the BH RLF is no longer present.

When Proposal 2 and/or Proposal 3 can be agreed on, the operation of the IAB-MT during recovery of the BH link should be studied, the IAB-MT having received the indication. The following was proposed: when the IAB-MT receives the Type 2 Indication, the IAB-MT reduces/stops the SR, and when the IAB-MT receives the Type 3 Indication (i.e., the BH RLF is no longer present in the parent IAB node), the IAB-MT resumes operation. This is one desirable operation of the IAB-MT when the parent node is trying to recover the BH link. It is assumed that other operations of the IAB-MT, such as operation of suspending all of the RBs, are also possible.

Proposal 4: RAN2 should agree with that the IAB-MT, who has received the Type 2 Indication and then reduced/stopped the scheduling request, resumes the scheduling request when the BH RLF is no longer present in the parent node.

Another possible operation relates to local re-routing, which has been proposed in many papers. Local re-routing is expected to be used for congestion mitigation, load balancing, etc., but may also be used for service continuity even in the case of an upstream BH RLF in the parent node or the like. For example, an IAB node can perform local re-routing upon receiving the Type 2 Indication, but in a routing configuration such as in Rel-16, the JAB node returns to the normal routing upon being notified of successful recovery from an upstream BH RLF by reception of the Type 3 Indication, or the like.

A new IAB-MT operation is available that is associated with the Rel-17 functionality, and the operation may be performed upon receipt of the Type 2 Indication. Therefore, in addition to Proposal 4, RAN2 should study other IAB-MT operations performed when the parent node is attempting to recover from the BH RLF.

Proposal 5: RAN2 should have discussions when other IAB-MT operations such as local re-routing are available that are performed while the parent node is attempting to recover the BH link.

While the BH link of the JAB node is under the RLF, it is assumed that the IAB-DU, which transmits an indication, transmits the BH RLF indication of Type 2. When an RLF occurs in the BH link, an indication is transmitted, and thus a case of the BH of single connection is easy. However, a case of the BH with duplex connectivity is more complicated. For example, upon detecting an RLF in the MCG, the JAB node initiates an MCG failure information procedure, but the SCG continues to function as a BH link, and thus the Type 2 Indication need not be transmitted at this time. When the MCG failure information procedure fails due to expiry of T316 or the like, the IAB-MT initiates RRC reestablishment, and therefore at this time, the Type 2 Indication is transmitted. Thus, the Type 2 Indication is transmitted when RRC reestablishment is initiated, not when the MCG/SCG failure information is triggered. In any case, because this concerns operation of the JAB-DU, whether to capture this in a specification/how to capture this should be carefully studied. That is, whether to add notes in stage 2 or stage 3 or nothing needs to be captured should be studied.

Proposal 6: RAN2 should agree that the BH RLF indication of Type 2 may be transmitted when the JAB-DU initiates RRC reestablishment, not when the JAB-DU initiates any of the RLF recovery procedures.

Proposal 7: RAN2 should discuss whether to capture the operation of the JAB-DU (i.e., Proposal 6) in a specification/how to capture the operation.

CHO Enhancements with Indication (Type 4) Conditional Handover (CHO) has been introduced in Rel-16 and, to our understanding, CHO can be used as-is for Rel-16 JAB. Many companies have proposed enhancement of CHO or the use of CHO for inter-donor IAB-node migration.

In Rel-16, CHO is performed when the corresponding CHO event (A3/A5) is satisfied or when a selected cell is a CHO candidate as a result of cell selection for RRC reestablishment. These trigger conditions can be satisfied when the JAB node experiences a BH RLF on the BH link. On the other hand, the trigger conditions cannot be satisfied under an IAB-specific RLF, such as an RLF due to reception of the BH RLF indication (Type 4), because the BH link owned by the IAB node is in a good radio state. In this case, one desirable operation is to perform CHO when the IAB node receives the BH RLF indication.

Therefore, in order to improve topology adaptation of Rel-17 eIAB, it is worth studying additional trigger conditions for CHO. At least the existing BH RLF indication (i.e., Type 4) is considered to be a promising candidate as a new trigger, but if introduced, further study can be conducted on whether CHO is performed upon receipt of the Type 2 Indication.

Proposal 8: RAN2 needs to study whether any additional trigger condition is defined for the CHO, i.e., study at least the case where the IAB node receives the BH RLF indication (Type 4). If introduced, further study is needed to see if is applicable to Type 2.

Enhancements of BH RLF Recovery and Cell (Re)Selection

In an RRC reestablishment procedure, the IAB-MT first executes a cell selection procedure in order to find an appropriate cell. In the cell selection procedure, potential problems were pointed out in Rel-16, such as one that the IAB-MT may select its descendant node. Thus, this was discussed in email discussion.

As illustrated in FIG. 17, possible five solutions were discussed and summarized together with the rapporteur's view.

The conclusion was that "no further action is taken on this topic in Rel-16". This means that RAN2 agreed on "Option 4: Nothing needed since RRC reestablishment will fail if there is no BH connectivity". Option 4 requires waiting for a failure (expiry of T301) and finally going to an idle state and was thus acceptable in a Rel-16 deployment scenario even when further time is required for BH RLF recovery.

Finding 4: In Rel-16, when the IAB node attempts an RRC reestablishment request to the descendant node, the IAB node needs to wait for a failure of the attempt, and finally go to an idle state.

In Rel-17, from the viewpoint of Proposal 1, cell (re) selection and RRC reestablishment may further frequently occur. Thus, suboptimal operation, that is, operation in accordance with Finding 4, shall cause significant deterioration in performance from the viewpoint of stability of the IAB topology and service continuity. Thus, in order to optimize the operation of the IAB-MT during BH RLF recovery, "the topic can be discussed again in Rel-17", as stated by the rapporteur of the above email discussion.

Proposal 9: RAN2 should agree to study optimization of cell (re)selection in order to avoid reestablishment to an inappropriate node (for example, a descendant node).

It may be assumed that a common concept in the solutions identified except for Option 4 above is that the IAB-MT is provided with a type of either a whitelist or a blacklist for the purpose of cell selection. For example, given that topology changes may frequently occur in Rel-17 due to "inter-donor IAB-node migration", the whitelist and the blacklist have advantages and disadvantages depending on the topology and the positions of the IAB nodes.

For example, from the viewpoint of an IAB node close to an IAB donor, that is, the uppermost in DAG topology, because the number of candidate nodes is small, and in some cases only an IAB donor DU, providing the whitelist is more reasonable.

However, in another example from a viewpoint of an IAB node very distant from the IAB donor, that is, the lowermost in DAG topology, a great number of candidate nodes may need to be included in the whitelist. Instead, for example, the blacklist may be more suitable because the blacklist includes only downstream IAB nodes of the IAB node to be concerned and in some cases includes only a small number of child IAB nodes, thus reducing overhead.

One of the concerns about the whitelist is that, due to the properties of "the inter-donor IAB-node migration" in Rel-17, the list may need to include candidate IAB nodes belonging to different/adjacent IAB topologies, and may thus have an increased size. On the other hand, downstream IAB nodes of course belong to the same IAB topology, and thus there are no such concerns about the blacklist.

Finding 5: The whitelist and the blacklist have advantages and disadvantages depending on the topology and the positions of the IAB nodes.

Thus, when information is provided to the child IAB node for the purpose of cell selection, the IAB donor (or the parent IAB node) may be desirably able to select the use of either the whitelist or the blacklist. Note that study should be also conducted on whether the reuse of this information for the purpose of cell reselection is beneficial.

Proposal 10: RAN2 should agree to provide the whitelist or the blacklist (i.e., selection structure) to the IAB-MT for the purpose of cell selection in order to avoid reestablishment to a descendant node. Whether these lists can also be used for a cell reselection procedure requires further study.

If Proposal 10 can be agreed on, how to provide the information (that is, the whitelist or the blacklist) should be further studied. Option 1 assumes CHO configuration, and some enhancements may be required. Option 2 assumes additional indications, for example, the BH RLF indication of Type 2. Option 3 assumes provision of information of the overall topology, which is not present in the existing configuration. Option 5 assumes OAM-based configuration; however, this is questionable as the rapporteur pointed out.

Considering again the assumption of Rel-17 (i.e., Proposal 1), that is, the need for the parent IAB node or the IAB donor to provide the list to the child IAB node in response to a topology change, the whitelist/blacklist needs to be dynamically provided. Thus, Option 5, that is, OAM, should be excluded. Which method, that is, which method out of Options 1, 2, and 3, is to be used as the baseline for the enhancements requires further study.

Proposal 11: RAN2 should agree that the parent IAB node or the IAB donor dynamically provides the whitelist/blacklist each time the topology is changed. The details thereof require further study.

Enhancements of Lossless Delivery

In the stage of research of Rel-15, the problem of multi-hop RLC ARQ was discussed and captured in Section 8.2.3 of TR. In Rel-16, the protocol stack was defined for the IAB including unsplit RLC layers. In other words, in Rel-16, end-to-end ARQ was excluded, and hop-by-hop ARQ was adopted.

Regarding the hop-by-hop ARQ, the problem in end-to-end reliability, that is, lossless delivery with UL packets, was identified. As illustrated in FIG. 18, three solutions were identified and evaluated.

In Rel-16, "Modification of PDCP protocol/procedures" being a first solution was not adopted because it would affect a Rel-15 UE.

"Rerouting of PDCP PDUs buffered on intermediate IAB-nodes" corresponding to a second solution was supported as an implementation selection in the BAP layer. The BAP layer may implement the second solution on the assumption that "data buffering in a transmission part of a BAP entity until an RLC-AM entity receives an acknowledgment response is implementation dependent, for example". These BAP implementations were considered in order to avoid packet loss in "most" of the cases of the Rel-16 deployment scenario, that is, the cases where stationary IAB nodes are used. However, the implementations were not perfect as illustrated in FIG. 18, for example.

"Introducing UL status delivery" corresponding to a third solution was a promising solution for guaranteeing lossless delivery of UL data, with evaluation results cited in FIG. 18 taken into consideration. The idea was to delay the RLC ARQ to the UE, so that PDCP data recovery at the UE is initiated when necessary. However, this was not defined in Rel-16 because it had been assumed that UL packets would be rarely dropped due to topology change as the stationary IAB node was assumed.

Considering the assumption of Rel-17, that is, from the viewpoint of Proposal 1, it is no longer rare that UL packets are lost during the topology change, which occurs frequently in Rel-17, and thus the third solution should be further studied. Thus, RAN2 should discuss an enhancement mechanism for guaranteeing lossless delivery in an L2 multi-hop network, in addition to the results captured in TR.

Proposal 12: RAN2 should agree to introduce a solution identified in TR 38.874, that is, a mechanism to guarantee lossless delivery under a condition that the topology change possibly frequently occur based on some form of "UL status delivery".

For the details of the third solution, that is, "Introducing UL status delivery", two options, namely C-1 and C-2, were discussed via email as illustrated in FIG. 19.

Regarding C-1 above, it is assumed that a "confirmation" from the IAB donor needs to be defined in the BAP or the RRC for end-to-end signaling forwarding via the multi-hop L2 network. Thus, in order to define the option, a relatively high standard effort shall be required.

Regarding C-2 above, when C-2 fully functions in the IAB topology and the RLC ACK is to be transmitted to the UE (or the downstream IAB node) even if it needs to be assumed that OAM configures all of the IAB nodes with the use of the option, it finally depends on IAB-DU implementation, and thus C-2 can be actually implemented for a Rel-16 IAB node as well. Because hop-by-hop feedback is assumed and no additional Control PDUs are assumed, C-2 is easier to implement than C-1. Thus, C-2 should be the baseline for the enhancements of Rel-17 for lossless delivery of the UL packets.

Finding 6: C-2 being a solution of "Introducing UL status delivery" may be the baseline for the enhancements of Rel-17, and this can be implemented for Rel-16 as well.

Note that, because Rel-17 should assume dynamic topology change that causes UL packet loss, the enhancements of Rel-17 shall support C-2 as a standard support function. At least in the specification of stage 2, an overall mechanism based on C-2 should be described. Otherwise, in the 3GPP standard, lossless delivery is not guaranteed during the handover of the IAB node. In stage 3, although minor changes such as those of the RLC and/or the BAP are expected, these are regarded as internal operations of the IAB node, and thus details thereof may not be defined.

Proposal 13: RAN2 should agree to define an RLC ARQ mechanism for lossless delivery of UL packets in stage 2. This delays transmission of the ACK to the child node/UE before the ACK is received from the parent IAB node (i.e., C-2). Whether to define this in stage 3/how to define this require further study.

Inter-Donor IAB-Node Migration

The IAB node integration procedure is introduced into Rel-16 and is used for the initial integration of IAB nodes. In other words, the IAB node integration procedure is still in the service suspension phase.

Rel-17 is intended to specify the inter-donor IAB-node migration, which provides robust operation and is to be applied to mobile IAB nodes. Unlike in Rel-16, the inter-donor IAB-node migration in Rel-17 is performed in a working phase, and thus the inter-donor IAB-node migration of one IAB node affects the entire topology and causes service interruption. In other words, for the Rel-17 inter-donor IAB-node migration, study needs to be conducted about how each of all IAB nodes in the IAB topology migrates to another IAB donor, specifically how RRC reconfiguration with synchronization (i.e., handover command) is provided to the affected IAB nodes.

Figure 20:
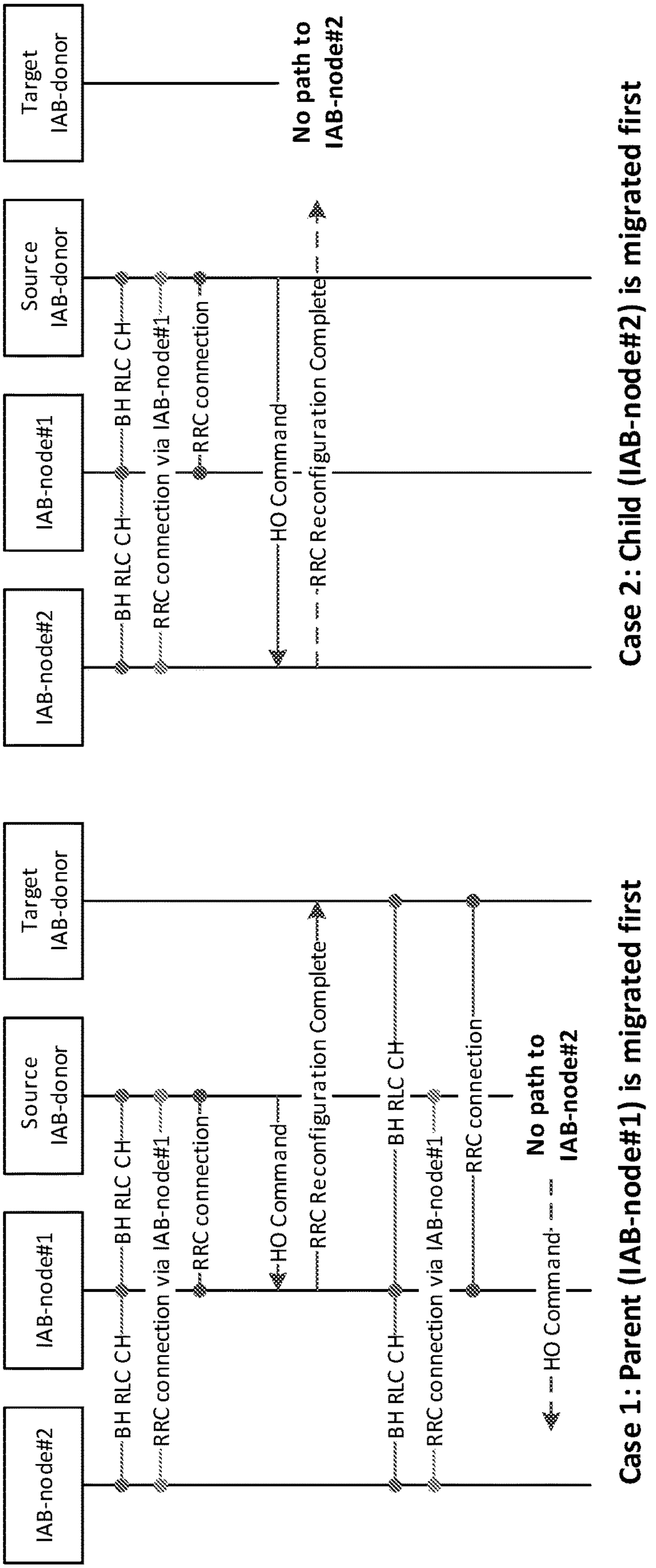
FIG. 20 illustrates a potential problem of RAN2 signaling during inter-donor IAB-node migration.

As illustrated in FIG. 20, assuming that a child node (IAB node #2) is connected to a source IAB donor via a parent node (IAB node #1), a set of signaling problems may occur.

Case 1: When the parent is first migrated, the RRC signaling path between the child and the source donor is released. Therefore, how the child node can be migrated is unknown. Case 2: When the child is first migrated, the RRC signaling path to the target donor via the parent node has yet to be established. Accordingly, how the child node accesses the target donor (i.e., how to complete and transmit the RRC reconfiguration to the target donor) is unknown.

For Case 1, study is conducted about the reuse of CHO using some enhancements of the child node, that is, when the parent node is migrated, the child node executes CHO.

For Case 2, the child is considered to wait to send an RRC reconfiguration to the target donor, e.g., until the parent node is migrated.

In either case, an option may be that the child node is first released and that re-integration is then performed by using the Rel-16 procedure. This; however, may not be expected to be a solution in Rel-17, considering critical service interruption.

Although RAN3 has been discussing the general procedure of the inter-donor IAB-node migration, RAN2 needs to study the impact of RAN2 on how to reconfigure a plurality of IAB nodes in a multi-hop network.

Proposal 14: RAN2 needs to study how to reconfigure multi-hop IAB nodes for the inter-donor IAB-node migration.

The invention claimed is:

1. A communication control method used in a cellular communication system, the communication control method comprising:

transmitting, by a first donor base station to a relay node having a lower apparatus under the relay node, a message for migration from the first donor base station to a second donor base station; and performing, by the first donor base station, a process to remove a path between the relay node and the first donor base station after connection of the relay node to the second donor base station is completed and after migration of the lower apparatus from the first donor base station to the second donor base station is completed, wherein the path comprises an F1 interface established between a Distributed Unit (DU) of the relay node and a Central Unit (CU) of the first donor base station, and wherein the process includes:

determining, by the first donor base station, whether handover of the lower apparatus from the first donor base station to the second donor base station is completed; and removing the F1 interface representing the path between the relay node and the first donor base station in response to the first donor base station determining that the handover of the lower apparatus from the first donor base station to the second donor base station is completed.

2. The communication control method according to claim 1, further comprising, upon completing connection of the relay node to the second donor base station, transmitting, by the relay node to the lower apparatus, a predetermined notification, wherein the predetermined notification indicates that the connection is completed or that access to the second donor base station is allowed.

3. The communication control method according to claim 1, further comprising transmitting, by the first donor base station and to the lower apparatus via the relay node, a message instructing migration from the first donor base station to the second donor base station, wherein the message comprises an indicator suspending access to the second donor base station.

4. The communication control method according to claim 1, further comprising:

upon completing connection of the relay node to the second donor base station, transmitting, by the relay node to the lower apparatus, a predetermined notification; and starting, by the lower apparatus, access to the second donor base station in response to receiving the predetermined notification.

5. The communication control method according to claim 1, further comprising transmitting, by the first donor base station to the lower apparatus, configuration information of conditional handover comprising a trigger condition, wherein the configuration information comprises a trigger condition of causing, when the relay node completes the connection to the second donor base station, the lower apparatus to execute handover.

6. The communication control method according to claim 5, wherein the trigger condition includes receiving a notification from an upper node.

7. The communication control method according to claim 1, further comprising upon completing the connection to the second donor base station, transmitting, by the relay node to the second donor base station, a first access message directed to the second donor base station received from the lower apparatus.

8. The communication control method according to claim 7, wherein the transmitting comprises suspending, by the relay node, transfer of the first access message to the second donor base station until the connection to the second donor base station is completed.

9. The communication control method according to claim 7, further comprising:

performing, by the relay node having the lower apparatus under the relay node and another relay node under the relay node, migration from the first donor base station to the second donor base station together with the lower apparatus and the another relay node, wherein the transmitting comprises, upon receiving a message instructing group handover from the first donor base station and completing the connection to the second donor base station, transmitting, by the relay node and to the second donor base station, a second access message directed to the second donor base station received from the lower apparatus and a third access message directed to the second donor base station received from the another relay node.

10. A cellular communication system, comprising:

a relay node having a lower apparatus under the relay node; and a first donor base station, wherein the first donor base station is configured to:

transmit, to the relay node, a message for migration from the first donor base station to a second donor base station;

perform a process to remove a path between the relay node and the first donor base station after connection of the relay node to the second donor base station is completed and after migration of the lower apparatus from the first donor base station to the second donor base station is completed, wherein the path comprises an F1 interface established between a Distributed Unit (DU) of the relay node and a Central Unit (CU) of the first donor base station, and wherein the process includes:

determining, by the first donor base station, whether handover of the lower apparatus from the first donor base station to the second donor base station is completed; and removing the F1 interface representing the path between the relay node and the first donor base station in response to the first donor base station determining that the handover of the lower apparatus from the first donor base station to the second donor base station is completed.

* * * * *